United States Patent [19]
Frazier et al.

[11] 4,423,923
[45] Jan. 3, 1984

[54] METHOD AND FIXTURE FOR COUPLING OPTICAL FIBERS

[75] Inventors: Gary A. Frazier, Plano; Milo R. Johnson, Richardson, both of Tex.

[73] Assignee: Texas Instruments Incorporated, Dallas, Tex.

[21] Appl. No.: 308,345

[22] Filed: Oct. 5, 1981

[51] Int. Cl.³ .............................................. G02B 7/26
[52] U.S. Cl. .............................. 350/96.15; 350/96.21; 264/1.5; 156/158
[58] Field of Search ............... 350/96.15, 96.20, 96.21, 350/96.22; 264/1.5; 156/158

[56] References Cited

U.S. PATENT DOCUMENTS

| | | | |
|---|---|---|---|
| 4,113,345 | 9/1978 | Gerndt | 350/96.15 |
| 4,212,512 | 7/1980 | Hodge | 350/96.15 |

FOREIGN PATENT DOCUMENTS

| | | | |
|---|---|---|---|
| 2349012 | 4/1975 | Fed. Rep. of Germany | 350/96.20 |
| 2411814 | 9/1975 | Fed. Rep. of Germany | 350/96.21 |
| 55-9535 | 1/1980 | Japan | 350/96.21 |
| 56-22403 | 3/1981 | Japan | 350/96.15 |

OTHER PUBLICATIONS

Wielar, Proceedings of the Society of Photo-Optical Instrumentation Engineers Seminar on Fibre Optics Come of Age, vol. 31, San Mateo, California, USA, Oct. 16-17, 1972, "Plastic Optical Fibers," pp. 3-12.

*Primary Examiner*—John D. Lee
*Assistant Examiner*—Frank González
*Attorney, Agent, or Firm*—James T. Comfort; Robert O. Groover, III; Melvin Sharp

[57] ABSTRACT

Coupler for joining two optical fibers to a third fiber, while preserving good optical isolation between the first two fibers. The coupler is preferably formed of an approximately index-matching plastic, and the fiber ends are cemented in place. The two fibers which are to be isolted are located parallel and adjacent to each other, and their ends are glued into an elongated hole on one side of the coupler. Opposite to this hole is a second hole into which the union fiber is seated. Epoxy glue is used to connect the fibers in place. Plastic fibers are preferably used.

9 Claims, 2 Drawing Figures

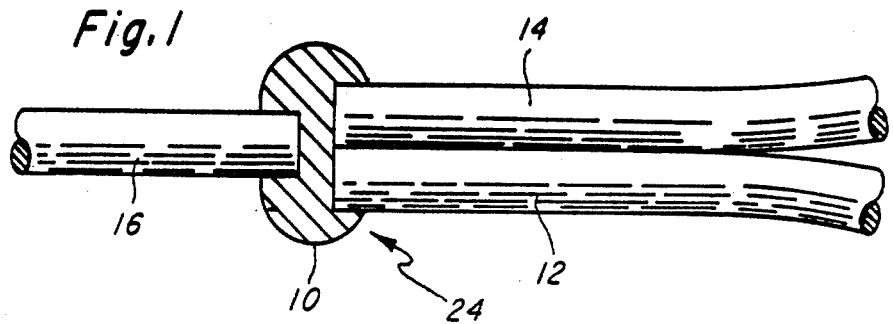
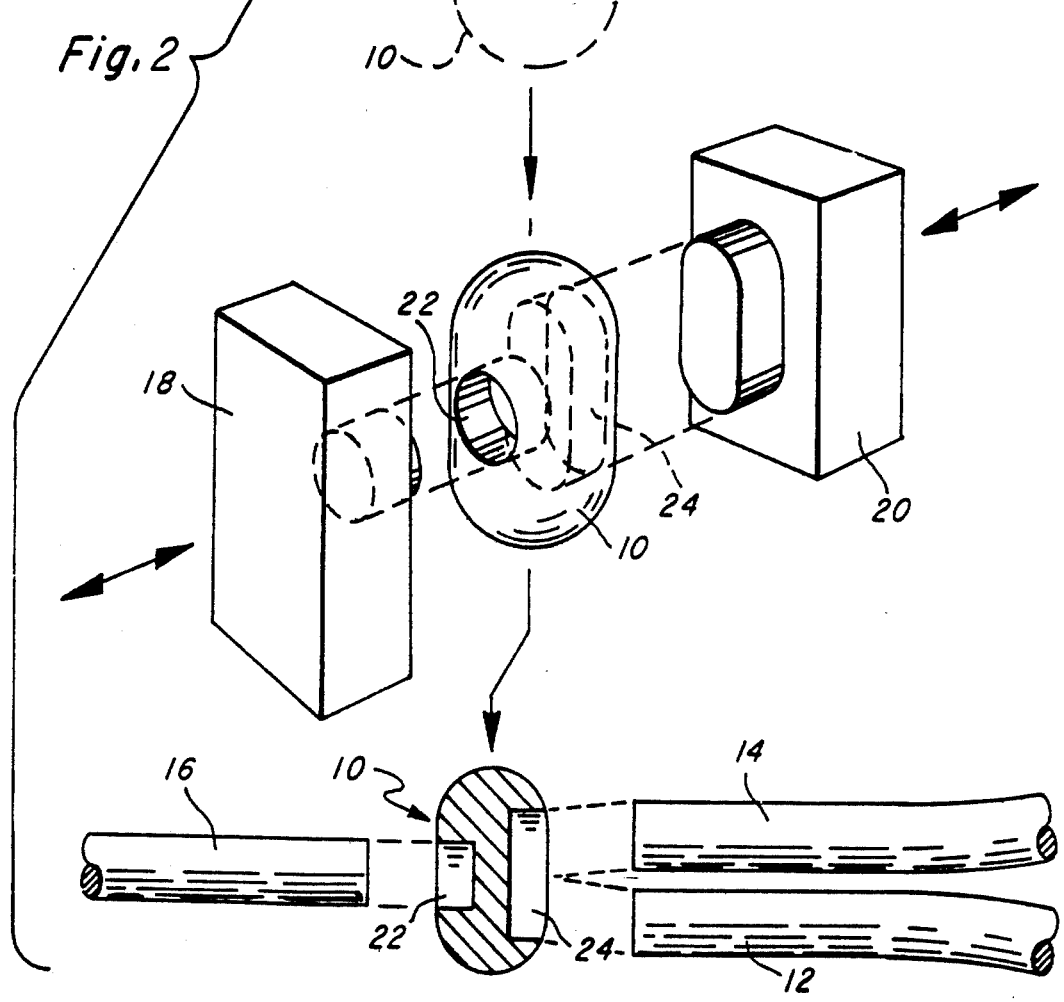

METHOD AND FIXTURE FOR COUPLING
OPTICAL FIBERS

BACKGROUND OF THE INVENTION

The present invention relates to a method for coupling two mutually isolated optical fibers to a third optical fiber.

It would be highly desirable, for a bar code reader, to be able to inexpensively manufacture a coupling which joined two mutually isolated optical fibers to third optical fiber. For example, the two mutually isolated fibers could be connected to a light source and a light detector respectively, and the union fiber could be used both to illuminate and to detect light reflected from a bar code pattern.

Optical couplers fall into two main categories: integrated and discrete. Integrated optical couplers are growths or diffusions into a planar material which act as areas to specifically direct optical information. A three port integrated optical coupler allows optical information to be guided within these diffused or grown "walls". The main disadvantages of these couplers are two-fold. First, the material required to generate these planar structures is of high cost. Secondly, for long path lengths, the ability to pattern the coupler in a plane material becomes very difficult. The solution to this problem has been to couple discrete optical fibers to the planar coupler. The cost incurred in producing a reliable joint between the discrete fibers and the planar coupler is high.

Discrete optical fibers can be coupled in a variety of ways. For example, a bundle of fibers can be inserted into a cup which has a high optical reflectance. In such a case, all light which enters the cup from any or all of the inserted optical fibers will be directed with equal strength back along all of the fibers. Such a design does not allow any two fibers to be optically isolated from each other since all fibers are coupled optically with equal efficiency.

Optical couplers which isolate two fibers, while coupling both to a third fiber, have been made using glass fibers by the use of a heat fusion process. In practice, two fibers are butted endwise against the end of a similar fiber and subsequently heated until a mechanical and optical joint is formed. This technique has the disadvantage that the ends of the optical fibers must be cut and polished before fusing, so that the coupler will have high optical efficiency. This procedure is costly due to the time and equipment required. Furthermore, this process has not been successful when plastic optical fibers are used thereby requiring the use of a fragile glass coupler.

Thus, at present there is no known inexpensive method for joining a mutually isolated pair of optical fibers to a third optical fiber while minimizing the optical loss.

It is thus an object of the present invention to provide a method for inexpensively joining two mutually isolated optical fibers to a third optical fiber while minimizing the optical loss.

It is a further object of the present invention to provide a coupler whereby two mutually isolated optical fibers can be joined to a third optical fiber with minimum loss.

It is a further object of the present invention to provide a method for joining two isolated optical fibers to a third optical fiber with minimum optical loss, without any requirement for polishing the ends of the optical fibers to be joined.

It is a further object of the present invention to provide a method for coupling two mutually isolated optical fibers to a third optical fiber while incurring minimum optical loss, wherein the fibers used may be plastic optical fibers.

It is a further object of the present invention to provide a method for assembling a coupling between two mutually isolated optical fibers and a third optical fiber with minimum loss, which can be rapidly and accurately performed by unskilled workers.

The majority of the optical fiber art has been directed to fibers suitable for high data rates for communications. However the problems presented by such applications are very different from the relevant problems and possibilities in such applications as those to which the present invention is directed.

In particular, low loss through the coupling is not an absolute necessity in a system for a barcode reader, but simply an economic factor, since greater loss can be compensated by using a more intense illumination source. By contrast, communications fiber systems are often required to reduce insertion loss to an extremely low level, if a particular system is to be possible at all.

Similarly, the problems of mode conversion, depolarization, etc., which are so important in design of couplers for communications fibers, are of no concern in the present case.

SUMMARY OF THE INVENTION

To achieve these and other objects of the present invention, there is provided a simple molded plastic fixture, having a circular recess in one side for insertion of the union fiber, and having an oval recess in the opposite side thereof wherein two mutually isolated fibers may be inserted adjacent to each other.

According to the present invention there is provided: a fiber optic coupler for coupling two mutually isolated fibers to a union fiber, comprising:

a body of light-transmissive material having first and second indentations formed therein:

wherein said first indentation and said second indentation are opposed on opposite sides of said body, and wherein said first and second indentation comprise respective plane faces parallel to each other;

and wherein said first indentation is substantially circular and has a diameter substantially equal to the diameter of one of said fibers, and wherein said second indentation has a major dimension equal to the sum of the diameters of said mutually isolated fibers.

According to the present invention there is also provided: a method for coupling first and second mutually isolated optical fibers to a third union optical fiber, comprising the steps of: Providing a body of light-transmissive material having first and second indentations formed therein: wherein said first indentation and said second indentation are opposed on opposite sides of said body, and wherein said first and second indentation comprise respective plane faces parallel to each other; and wherein said first indentation is substantially circular and has a diameter substantially equal to the diameter of said union fiber, and wherein said second indentation has a major dimension equal to the sum of the respective diameters of said mutually isolated fibers; wetting the end of said union fiber with glue, said glue when dry having an index of refraction which is approximately equal to that of said union fiber; inserting said union fiber into said first indentation; wetting the respective ends of said first and second fibers with glue, said glue when dry having an index of refraction which is approximately equal to that of said coupler and of said first and second fibers; and inserting said first and second fibers side by side into said second indentation of said coupler.

BRIEF DESCRIPTION OF THE DRAWINGS

The present invention will be described with reference to the accompanying figures, wherein:

FIG. 1 is a sectional view of a coupling formed by the present invention; and

FIG. 2 shows the method of forming an optical connection according to the present invention.

DESCRIPTION OF THE PREFERRED EMBODIMENTS

The present invention is preferably applied to the union of three clad plastic optical fibers. FIG. 1 shows a coupler body 10 according to the present invention, including indentations 22 and 24 in which are glued two mutually isolated fibers 12 and 14 and a third union fiber 16. The axes of all three fibers must be approximately parallel, and the axis of fiber 16 should preferably be positioned so that, if the axes of all three fibers were infinitely extended, the axis of fiber 16 would lie midway between the axes of fiber 12 and fiber 14. The coupler body 10 must comprise an optical quality plastic, which ideally should be index-matched with the plastic optical fibers. For example, in the currently preferred embodiment 0.005" diameter polymethylmethacrylate (Dupont "Crofon" (TM) type) clad fibers are used, and the body of the coupler 10 is made of polystyrene or polymethylmethacrylate. In addition, epoxy glue is used to join the fibers 12, 14, and 16 to the coupler 10. This glue is itself very well index-matched to both the fibers and the coupler, and very little unnecessary attenuation through the coupler is incurred.

If 5 mil fiber diameters are used, the spacing between the end of fiber 16 and the ends of fibers 14 and 12 is preferably 7 mils or less. If the spacing is made larger, an increased amount of energy will be radiated through the walls of the coupler 10. In any arrangement where one fiber is coupled to two, a 3dB loss is inevitable. However, crucial factors in coupling design are dissipation within the coupling, and radiation of energy which is not coupled into an output fiber. The mechanical design of the present invention prevents all but a very small amount of dissipation within the coupling, but external radiation loss remains dependent on the spacing of fibers, as discussed above. In the presently preferred embodiment, where the diameter of each fiber is 5 mils (130 microns), the preferred overall size of the coupler 10 is approximately 150 mils across the major axis, and approximately 115 mils across its minor axis.

The optimal maximum spacing of the fiber ends, for any materials and fiber dimensions, is determined as follows. Where $M_1$ is the index of refraction of each fiber core, $M_2$ is the index of fiber cladding, $M_3$ is the index of the material in the coupler body 10, and d is the fiber diameter, the maximum deviation $D_{max}$ of light launched from the end of a fiber, measured with respect to the fiber axis, is:

$$D_{max} = \arcsin\left(\frac{M_1}{M_3}\sin\left[\arccos\left(\frac{M_2}{M_1}\right)\right]\right)$$

The maximum optimal gap spacing $X_{opt}$ is then:

$$X_{opt} \leq \frac{d}{2\tan(D_{max})}$$

A closer spacing may cause slightly greater loss, but in practice this is not a problem. However, gap spacings greater than $X_{opt}$ will cause significantly greater loss.

It is also desirable to exclude stray light from a fiber coupler, since background light will raise the noise level and degrade the signal-to-noise ratio. The shape of the coupler body 10 contributes to background light exclusion, and further exclusion is preferably provided by applying black paint over the coupler with the fibers in place.

FIG. 2 shows a molding process by which the coupler used in the present invention may be economically formed. To preserve the spacing relationship discussed above, the two male mold pieces 18 and 20 should be mechanically limited in their travel, so that the spacing between the inner flat surfaces of the two cavities formed is precisely controlled. In addition, it should be noted that the molding pieces are very slightly tapered, so that tapered sidewalls are produced in the two cavities formed in the optical coupler 10. This permits much easier assembly during manufacturing, and does not significantly degrade the optical performance. Since a few degrees of misalignment of the fiber axis may be tolerated, a taper of a few degrees in the walls of the optical coupler 10 are also tolerable.

The shape of the second indentation 24 is preferably oval, and is so shown in FIG. 2. However, other shapes are also possible. Preferably the second indentation 24 should support the sides of fiber 12 and 14 so that their axes do not become misaligned. However, the second indentation 24 can be formed as a circle having a diameter twice that of the fibers; in this case, to prevent fibers 12 and 14 from rotating out of parallel, greater control is required in the assembly operation and the present would be practiced inefficiently. Thus, one important advantage of the preferred embodiment of the invention is obtained by lateral support for the fibers 12 and 14 within the second indentation 24. To provide such lateral support, the indentation 24 is formed to include a minor dimension (across at least part of the indentation) which is equal to one fiber diameter. For example, the indentation 24 could be formed as two adjacent and connected circular indentations of equal diameter and depth.

Once the optical coupler 10 has been formed, assembly simply requires that the end of each fiber be wetted with epoxy glue and then placed within the coupler fixture. Since no precise assembly tolerances are imposed, assembly by hand, or assembly using simple automated manufacturing facilities, is possible.

As will be obvious to those skilled in the art, a broad range of equivalents to and variations on the preferred embodiment discussed above is possible, and the scope of the inventive concepts discussed with reference to the principal preferred embodiment is explicitly not limited thereby. For example, it is not strictly necessary that fiber 16 be placed symmetrically with respect to fibers 12 and 14. If fiber 16 were slightly closer to one of the two fibers 12 and 14, performance would be slightly degraded, but the present invention would still have been applied.

What is claimed is:

1. A fiber optic coupler for coupling two mutually isolated fibers to a union fiber, comprising:
    a body of light-transmissive material having first and second indentations formed therein:
    wherein said first indentation and said second indentations are opposed on opposite sides of said body, and wherein said first and second indentation comprise respective plane faces parallel to each other; and wherein said first indentation is substantially circular and has a diameter substantially equal to the diameter of said union fiber, and wherein said second indentation has a major dimension equal to the sum of the respective diameters of said mutually isolated fibers.

2. The coupler of claim 1, wherein said second indentation has a minor dimension equal to the diameter of one of said fibers.

3. The coupler of claim 1, wherein said first and second indentation comprise tapered sidewalls.

4. The coupler of claim 1, 2, or 3, wherein said body comprises polymethylmethacrylate.

5. The coupler of claim 1, 2, or 3, wherein said respective plane faces of said indentations are separated by a maximum of $$\frac{d}{2\tan(D_{max})},$$

where d is equal to the diameter of the smallest of said fibers and $$D_{max} = \arcsin\left\{\frac{M_1}{M_3}\sin\left[\arccos\left(\frac{M_2}{M_1}\right)\right]\right\}$$

where $M_1$ is the index of refraction of a core within each of said fibers, $M_2$ is the index of cladding of each of said fibers, and $M_3$ is the index of said light-transmissive material.

6. A method for coupling first and second mutually isolated optical fibers to a third union optical fiber, comprising the steps of:
    providing a body of light-transmissive material having first and second indentations formed therein; wherein said first indentation and said second indentations are opposed on opposite sides of said body, and wherein said first and second indentation comprise respective plane faces parallel to each other; and wherein said first indentation is substantially circular and has a diameter substantially equal to the diameter of said union fiber, and wherein said second indentation has a major dimension equal to the sum of twice the respective diameters of said mutually isolated fibers;
    wetting the end of said union fiber with glue, said glue when dry having an index of refraction which is approximately equal to that of said union fiber;
    inserting said union fiber into said first indentation;
    wetting the respective ends of said first and second fibers with glue, said glue when dry having an index of refraction which is approximately equal to that of said coupler and of said first and second fibers; and
    inserting said first and second fibers side by side into said second indentation of said coupler.

7. The method of claim 6, wherein said glue is epoxy glue, and wherein said optical fibers are plastic.

8. The method of claim 7, wherein said body of transparent material comprises polymethylmethacrylate.

9. The method of claim 6, wherein said respective plane faces of said indentations are separated by at most $$\frac{d}{2\tan(D_{max})},$$

where d is equal to the diameter of the smallest of said fibers and $$D_{max} = \arcsin\left\{\frac{M_1}{M_3}\sin\left[\arccos\left(\frac{M_2}{M_1}\right)\right]\right\},$$

where $M_1$ is the index of refraction of a core within each of said fibers, $M_2$ is the index of cladding of each of said fibers, and $M_3$ is the index of said light-transmissive material.

* * * * *